US008126496B2

(12) United States Patent
Brisebois et al.

(10) Patent No.: US 8,126,496 B2
(45) Date of Patent: Feb. 28, 2012

(54) SIGNALING-TRIGGERED POWER ADJUSTMENT IN A FEMTO CELL

(75) Inventors: Arthur Richard Brisebois, Cumming, GA (US); Kurt Donald Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 555 days.

(21) Appl. No.: 12/275,015

(22) Filed: Nov. 20, 2008

(65) Prior Publication Data

US 2009/0280853 A1 Nov. 12, 2009

Related U.S. Application Data

(60) Provisional application No. 61/051,273, filed on May 7, 2008.

(51) Int. Cl.
*H04B 7/005* (2006.01)
(52) U.S. Cl. ....... 455/522; 455/231; 455/444; 455/13.4; 455/67.11; 455/423; 370/252
(58) Field of Classification Search .................. None
See application file for complete search history.

(56) References Cited

U.S. PATENT DOCUMENTS

| 6,151,505 | A  | 11/2000 | Larkins |
| 6,219,786 | B1 | 4/2001  | Cunningham et al. |
| 6,266,537 | B1 | 7/2001  | Kashitani et al. |
| 6,363,261 | B1 | 3/2002  | Raghavan |
| 6,483,852 | B1 | 11/2002 | Jacquet et al. |
| 6,484,096 | B2 | 11/2002 | Wong |
| 6,710,651 | B2 | 3/2004  | Forrester |
| 6,718,023 | B1 | 4/2004  | Zolotov |
| 7,080,139 | B1 | 7/2006  | Briggs et al. |
| 7,142,861 | B2 | 11/2006 | Murai |
| 7,146,153 | B2 | 12/2006 | Russell |
| 7,209,739 | B1 | 4/2007  | Narayanabhatla |

(Continued)

FOREIGN PATENT DOCUMENTS

GB 2425921 A 11/2006

OTHER PUBLICATIONS

International Search Report and Written Opinion dated Oct. 27, 2009 for PCT Application Serial No. PCT/US2009/043861, 14 Pages.

(Continued)

*Primary Examiner* — Tuan Pham
*Assistant Examiner* — Fanghwa Wang
(74) *Attorney, Agent, or Firm* — Turocy & Watson, LLP

(57) ABSTRACT

System(s) and method(s) are provided for signaling-triggered power adjustment in a femto cell. Attachment signal activity is measured and a set of derived signaling activity metrics are assessed and compared with a set of thresholds. An activity metric that overcomes an associated threshold results in a power adjustment of the transmission power of a femto access point (AP). By monitoring LAU (location area update), RAU (routing area update), and call activity, signaling activity metrics (e.g., signaling failure rate, access control rejection rate, or dwell time) are determined and a femto AP can optimize transmission power to ensure coverage maintenance and confinement, as well as mitigate unnecessary signaling. Alarm(s) can be conveyed to a femto network platform when power increases after an adjustment cycle; alarm(s) can prompt a network-based response to actively address femto cell operation. Signaling-triggered power management affects operation of AP serving the femto cell and served mobile terminals.

20 Claims, 10 Drawing Sheets

U.S. PATENT DOCUMENTS

| | | |
|---|---|---|
| 7,277,410 B2 | 10/2007 | Homeman |
| 7,496,383 B2 | 2/2009 | Kurata |
| 7,613,444 B2 | 11/2009 | Lindqvist et al. |
| 7,623,857 B1 | 11/2009 | O'Neil |
| 7,751,826 B2 | 7/2010 | Gardner |
| 7,768,983 B2 | 8/2010 | Nylander et al. |
| 7,885,644 B2 | 2/2011 | Gallagher et al. |
| 7,929,537 B2 | 4/2011 | Vasudevan et al. |
| 7,929,970 B1 | 4/2011 | Gunasekara |
| 7,941,144 B2 | 5/2011 | Nylander et al. |
| 2002/0098837 A1* | 7/2002 | Ferrario et al. ............... 455/423 |
| 2002/0123365 A1 | 9/2002 | Thorson |
| 2002/0142791 A1* | 10/2002 | Chen et al. .................... 455/522 |
| 2003/0125044 A1 | 7/2003 | Deloach |
| 2003/0153302 A1 | 8/2003 | Lewis et al. |
| 2004/0111382 A1 | 6/2004 | Haji-Ioannou |
| 2004/0258003 A1 | 12/2004 | Kotot et al. |
| 2005/0003797 A1 | 1/2005 | Baldwin |
| 2005/0144279 A1 | 6/2005 | Wexelblat |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0250527 A1 | 11/2005 | Jugl |
| 2005/0254451 A1 | 11/2005 | Grosbach |
| 2006/0075098 A1 | 4/2006 | Becker et al. |
| 2007/0002844 A1 | 1/2007 | Ali |
| 2007/0008894 A1* | 1/2007 | Lynch et al. .................. 370/244 |
| 2007/0032225 A1 | 2/2007 | Konicek et al. |
| 2007/0032269 A1 | 2/2007 | Shostak |
| 2007/0074272 A1 | 3/2007 | Watanabe |
| 2007/0097938 A1 | 5/2007 | Nylander et al. |
| 2007/0097939 A1 | 5/2007 | Nylander et al. |
| 2007/0097983 A1 | 5/2007 | Nylander et al. |
| 2007/0099561 A1* | 5/2007 | Voss ............................. 455/12.1 |
| 2007/0124802 A1 | 5/2007 | Anton et al. |
| 2007/0155421 A1 | 7/2007 | Alberth et al. |
| 2007/0167175 A1 | 7/2007 | Wong |
| 2007/0183427 A1 | 8/2007 | Nylander et al. |
| 2007/0184815 A1 | 8/2007 | Aebi |
| 2007/0199076 A1 | 8/2007 | Rensin et al. |
| 2007/0258418 A1 | 11/2007 | Wurtenberger et al. |
| 2007/0270152 A1 | 11/2007 | Nylander et al. |
| 2007/0287501 A1 | 12/2007 | Hoshina |
| 2008/0076392 A1 | 3/2008 | Khetawat et al. |
| 2008/0076393 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0132239 A1 | 6/2008 | Khetawat et al. |
| 2008/0133742 A1 | 6/2008 | Southiere et al. |
| 2008/0181184 A1* | 7/2008 | Kezys ........................... 370/338 |
| 2008/0207170 A1 | 8/2008 | Khetawat et al. |
| 2008/0244148 A1 | 10/2008 | Nix et al. |
| 2008/0299984 A1 | 12/2008 | Shimomura |
| 2009/0037973 A1 | 2/2009 | Gustave et al. |
| 2009/0047945 A1 | 2/2009 | Zhang |
| 2009/0061873 A1 | 3/2009 | Bao et al. |
| 2009/0082010 A1 | 3/2009 | Lee |
| 2009/0092096 A1 | 4/2009 | Czaja |
| 2009/0094351 A1 | 4/2009 | Gupta et al. |
| 2009/0094680 A1 | 4/2009 | Gupta et al. |
| 2009/0111499 A1 | 4/2009 | Bosch |
| 2009/0124262 A1 | 5/2009 | Vela et al. |
| 2009/0131050 A1 | 5/2009 | Osborn |
| 2009/0163216 A1 | 6/2009 | Hoang et al. |
| 2009/0163224 A1 | 6/2009 | Dean |
| 2009/0164547 A1 | 6/2009 | Ch'ng et al. |
| 2009/0170528 A1 | 7/2009 | Bull et al. |
| 2009/0191844 A1 | 7/2009 | Morgan et al. |
| 2009/0191845 A1 | 7/2009 | Morgan et al. |
| 2009/0210324 A1 | 8/2009 | Bhogal |
| 2009/0221303 A1 | 9/2009 | Soliman |
| 2009/0233574 A1 | 9/2009 | Shinozaki |
| 2009/0279701 A1 | 11/2009 | Moisand et al. |
| 2010/0022266 A1 | 1/2010 | Villier |
| 2010/0040026 A1 | 2/2010 | Melkesetian |

OTHER PUBLICATIONS

International Search Report and Written Opinion mailed Feb. 23, 2010, for PCT Application No. PCT/US2009/043846, 13 pages.
OA dated Dec. 31, 2009 for U.S. Appl. No. 11/457,129, 16 pages.
OA dated Apr. 17, 2009 for U.S. Appl. No. 11/276,269, 15 pages.
OA dated Nov. 4, 2008 for U.S. Appl. No. 11/276,269, 15 pages.
OA dated Jun. 17, 2010 for U.S. Appl. No. 11/457,129, 15 pages.
Kaul. "Verizon's $250 femto box—A deliberate ploy behind the aggressive pricing?". Posted Tue, Jan. 20, 2009 13:19:46 EST. Last viewed Sep. 11, 2009, 1 pg.
OA dated Mar. 29, 2011 for U.S. Appl. No. 12/276,002, 37 pages.
OA dated Apr. 13, 2011 for U.S. Appl. No. 12/276,058, 40 pages.
OA dated Apr. 19, 2011 for U.S. Appl. No. 12/276,238, 22 pages.
OA dated Jun. 14, 2011 for U.S. Appl. No. 12/275,878, 35 pages.
OA dated Jun. 22, 2011 for U.S. Appl. No. 12/484,072, 38 pages.
OA dated Jul. 7, 2011 for U.S. Appl. No. 12/276,257, 24 pages.
OA dated Jun. 28, 2011 for U.S. Appl. No. 12/275,925, 18 pages.
OA dated Jun. 8, 2011 for U.S. Appl. No. 12/484,026, 30 pages.
OA dated Aug. 18, 2011 for U.S. Appl. No. 12/275,416, 39 pages.
OA dated Sep. 14, 2011 for U.S. Appl. No. 12/276,002, 35 pages.
OA dated Oct. 5, 2011 for U.S. Appl. No. 12/276,058, 37 pages.
OA dated Oct. 6, 2011 for U.S. Appl. No. 12/465,483, 50 pages.
OA dated Oct. 4, 2011 for U.S. Appl. No. 12/484,135, 44 pages.
OA dated Jul. 21, 2011 for U.S. Appl. No. 12/175,293, 30 pages.

* cited by examiner

SIGNALING-TRIGGERED POWER ADJUSTMENT IN A FEMTO CELL

CROSS-REFERENCE TO RELATED APPLICATIONS

This application claims the benefit of U.S. Provisional Application Ser. No. 61/051,273 filed on May 7, 2008, entitled "SIGNALING-TRIGGERED POWER ADJUSTMENT IN A FEMTO CELL." The entirety of this provisional application is incorporated herein by reference.

TECHNICAL FIELD

The subject innovation relates to wireless communications and, more particularly, to power management in a femto cell through detection, and ensuing mitigation, of unnecessary signaling activity.

BACKGROUND

Femto cells—building-based wireless access points interfaced with a wired broadband network—are generally deployed to improve indoor wireless coverage and to offload a mobility radio access network (RAN) operated by a wireless network and service provider. Femto cells typically operate in licensed portions of the electromagnetic spectrum, and generally offer plug-and-play installation; e.g., automatic configuration of femto access point. Improved indoor coverage includes stronger signal and improved reception (e.g., voice or data), ease of session or call initiation, and session or call retention as well. Offloading a RAN reduces operational and transport costs for a service provider since a lesser number of end users utilizes over-the-air (OTA) radio resources (e.g., radio frequency bands and channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce cross-talk among terminals serviced by disparate, neighboring femto cells as well. Femto cells typically operate in licensed portions of the electromagnetic spectrum, and generally offer plug-and-play installation; e.g., automatic configuration of femto AP subsequent to femto cell subscriber registration with a service provider. Coverage improvements via femto cells can also mitigate customer attrition as long as a favorable subscriber perception regarding voice coverage and other data services with substantive delay sensitivity, or otherwise, is attained. In addition, a richer variety of wireless voice and data services can be offered to customers via a femto cell since such service offerings do not rely primarily on mobility RAN resources.

To facilitate coverage confinement, femto AP power management is generally implemented via various measures and mechanisms (e.g., scan measurements of the macro-cell environment). However, with such mechanisms, which typically are legacy mechanisms, excessive femto AP power may promote unnecessary signaling activity from mobile stations that are unauthorized to be served by the femto AP and in neighboring homes and outdoor locations. As a result, end users within these neighboring homes and outdoor locations may experience reduced battery life and ensuing degraded service and perceived user experience.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for signaling-triggered power adjustment in a femto cell. Attachment signaling activity is measured and a set of derived signaling activity metrics are assessed and compared with a set of thresholds. A signaling activity metric that overcomes an associated threshold results in a power adjustment of the transmission power of a femto access point (AP). Thresholds can be established based at least in part on historic attachment data. By monitoring LAU (location area update), RAU (routing area update), and call activity, a femto AP can optimize transmission power to balance coverage maintenance and confinement within the femto cell, as well as mitigate unnecessary signaling. Signaling activity metrics include, but are not limited to: (1) Signaling failure rate, (2) Access Control rejection rate, or (3) dwell time.

It should be appreciated that signaling-triggered power management as described herein affects operation of the AP serving the femto cell and served mobile terminals. In particular, aspects of the subject innovation facilitate the femto AP to adjust power in order to avoid undesired mobility behavior. Rather than adjust power according to indirect criteria that can fail to suit optimal signaling behavior, the subject innovation approach introduces signaling in the set of specific criteria, or metrics, utilized to manage transmission power. Among advantages provided by the various aspects described herein are less unnecessary signaling activity and improved user equipment battery life.

Aspects, features, or advantages of the subject innovation described the subject specification can be exploited in substantially any wireless communication technology, in connection with access point power management. For instance, Wi-Fi, Worldwide Interoperability for Microwave Access (WiMAX), Enhanced GPRS or Enhanced Data Rates for GSM (EDGE), 3rd Generation Partnership Project (3GPP) Long Term Evolution, 3rd Generation Partnership Project 2 (3GPP2) Ultra Mobile Broadband, 3GPP Universal Mobile Telecommunication System (UMTS), High-Speed Packet Access, or Zigbee. Additionally, substantially all aspects of the subject innovation as disclosed in the subject specification can be exploited in legacy telecommunication technologies such as GSM.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
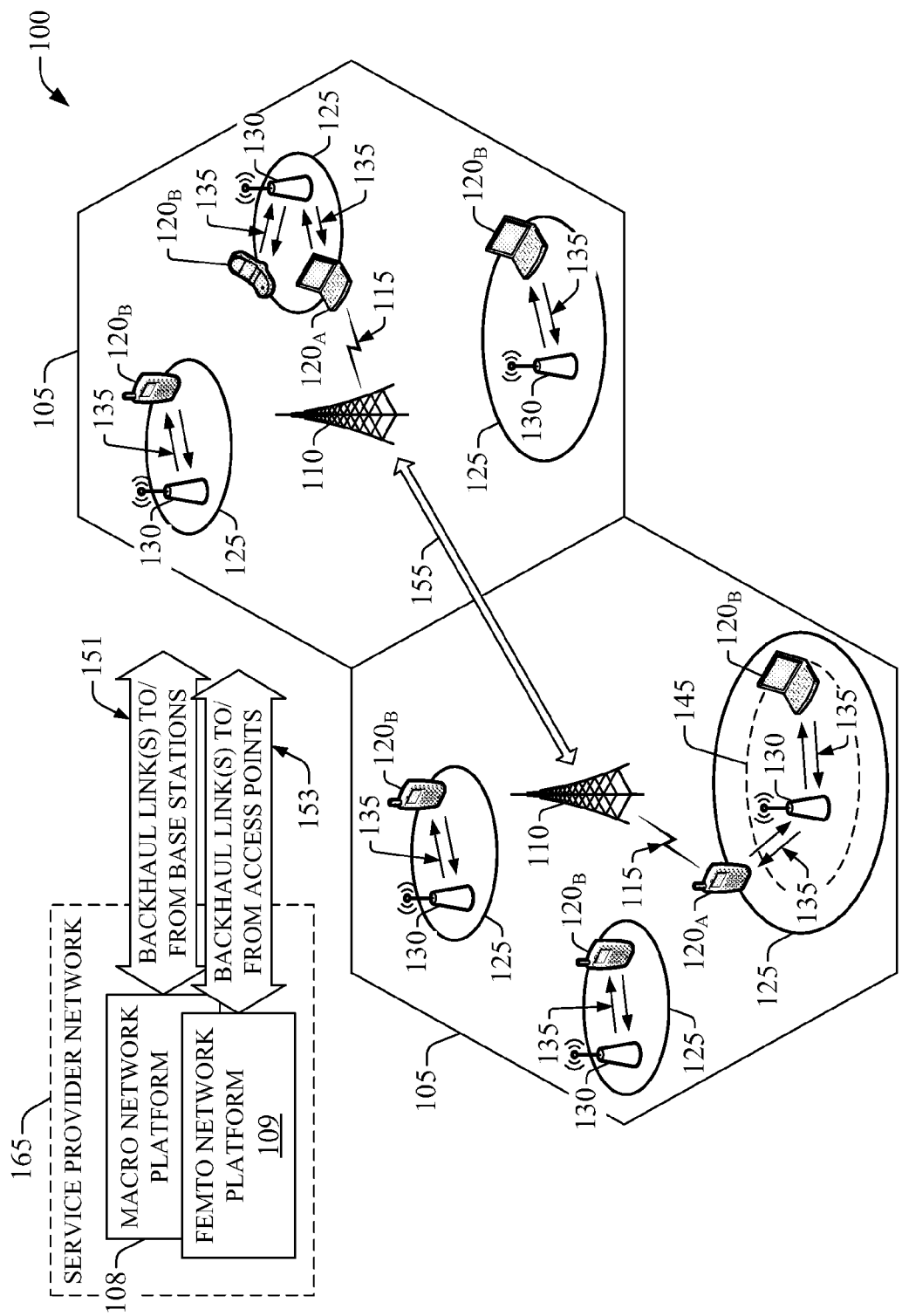
FIG. 1 illustrates a schematic deployment of a macro cells and a femto cells for wireless coverage, wherein femto cell access points can exploit aspects of the subject innovation.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "constructor," "interface" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, terms like "user equipment," "mobile station," "mobile," subscriber station," "access terminal," "terminal," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "Home Access Point," and the like, are utilized interchangeably in the subject application, and refer to a wireless network component or electronic appliance that serves and receives data, control, voice, video, sound, gaming, or substantially any data-stream or signaling-stream from a set of subscriber stations. Data and signaling streams can be packetized or frame-based flows. In addition, the terms "femto cell access point" and "femto access point" are utilized interchangeably.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell coverage areas 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell coverage area 125 typically covers an area that includes confined area 145, which is determined, at least in part, by transmission power allocated to femto AP 130, path loss, shadowing, and so forth. While femto cell coverage area 125 and confined area 145 typically coincide, it should be appreciated that in certain deployment scenarios, femto cell coverage area 125 can include an outdoor portion (e.g., a parking lot, a patio deck, a recreation area such as a swimming pool and nearby space) while area 145 spans an enclosed living space. Femto cell coverage area 125 typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within femto cell coverage area 125 via a wireless link 135 which encompasses a downlink and an uplink. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 and femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, like Iu-CS, Iu-PS, Gi, Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Conventional mechanisms address femto AP power control via various measures (e.g., scan measurements of macro cell environment) that fail to address signaling load drivers and symptoms directly. An embodiment of a femto AP 130 that exploits signaling activity to trigger power management procedures is discussed next.

Figure 2A:
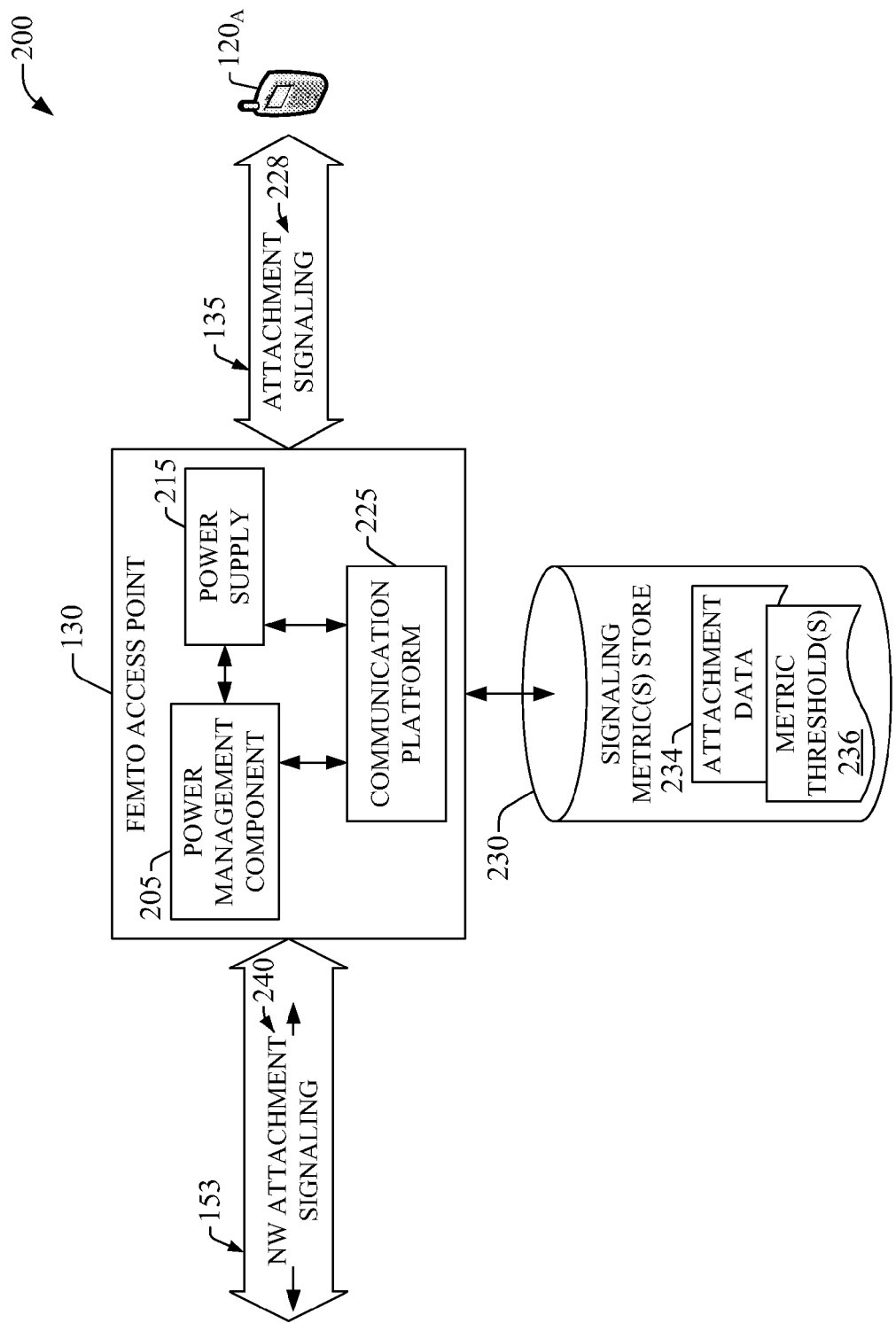
FIGS. 2A and 2B illustrate, respectively, a block diagram of an example system for signaling-triggered power management, or adjustment, in a femto AP, and example embodiments of a component that manages power and a component that detects attachment signaling in accordance with aspects described herein.
Figure 2B:
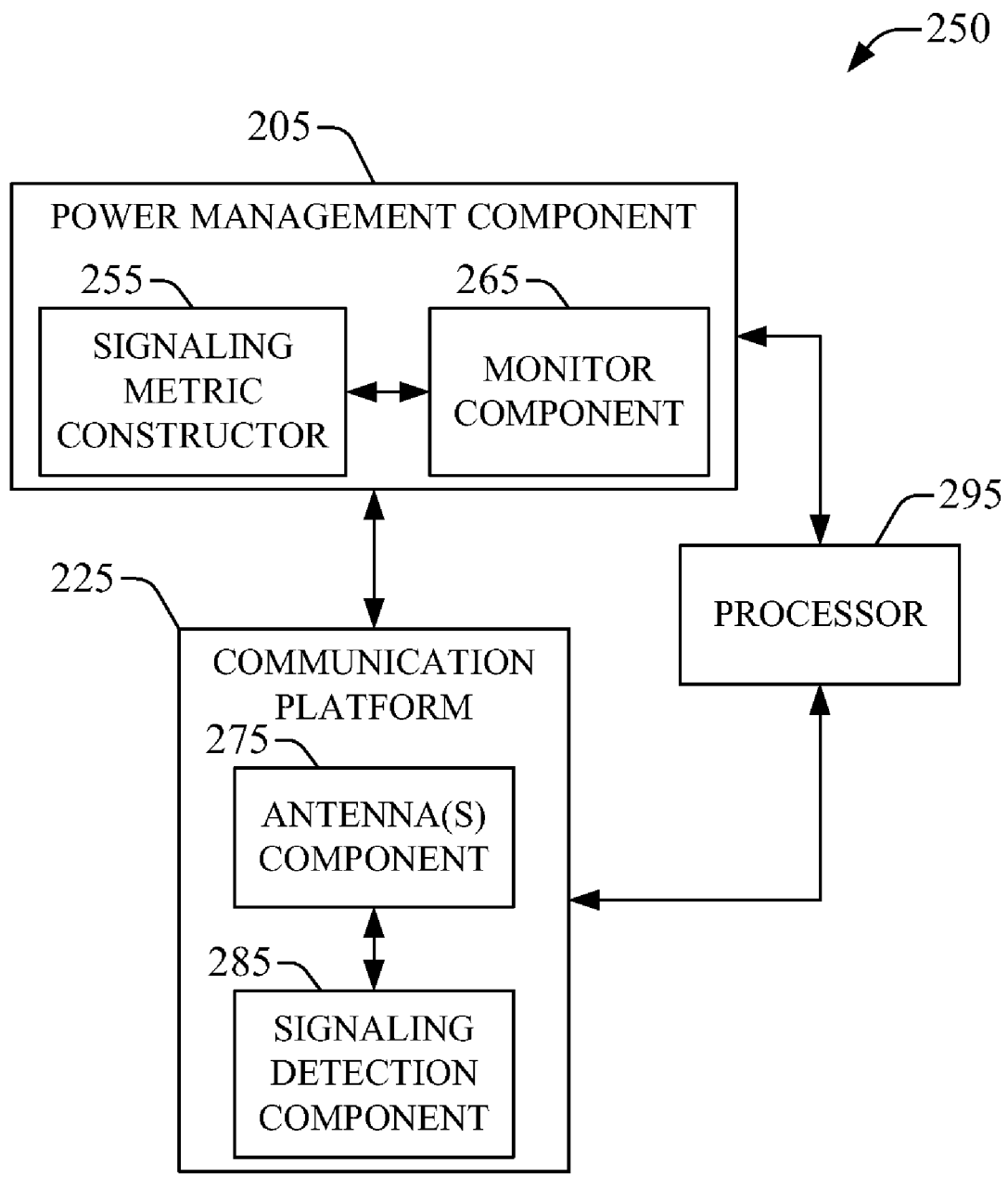

FIGS. 2A and 2B illustrate, respectively, a block diagram of an example system for signaling-triggered power management, or adjustment, in a femto AP, and example embodiments of a component that manages power and a component that detects attachment signaling in accordance with aspects described herein. With respect to FIG. 2A, in example system 200, both a mobile station $120_B$ and femto access point 130 convey and receive, via DL/UL 135, attachment signaling such as LAU/RAU process signaling in order for UE $120_B$ to be authorized to access coverage, and be served, by femto AP 130. To exploit such signaling activity for transmission power management, femto AP 130 includes a power management component 205 that is functionally coupled to a communication platform 225, which provides means to convey and receive attachment signaling 228, such as LAU/RAU signaling. In addition, communication platform 225 can detect and measure attachment signaling activity. Attachment signaling 228 is conveyed to power management component 205 and relayed, e.g., network (NW) attachment signaling 240, to a femto network platform (e.g., femto network platform 109) that facilitates operation of femto AP 130, which includes attachment of mobile devices (e.g., mobile $120_A$) thereto. It should be appreciated that NW attachment signaling 240 also includes attachment signaling originating from the femto network platform as a part of attachment procedure. Moreover, attachment signaling 228 is retained in attachment data 234, a memory element within signaling metric(s) store 230, which can be a part of a memory (not shown) functionally coupled to femto AP 130; it should be appreciated that the memory can be either internal or external to femto AP 130. From such attachment signaling 228 measurements and NW attachment signaling 240 in response to received attachment signaling at femto AP 130, power management component 205 can determine a signaling activity metric or criteria.

In an aspect of the subject innovation, a threshold is associated, or linked, to each signaling activity metric that is determined by power management component 205. Thresholds, and signaling activity metrics as well, can be stored in metric threshold(s) 236 within signaling metric(s) store 230. Such thresholds can be configured at a time femto access point 130 is provisioned, and can be adjusted either by a subscriber that manages (e.g., configures, restarts) femto access point 130, or automatically by femto AP 130 as described below. When a signaling activity metric drifts beyond its associated threshold, femto AP 130 can trigger an automated transmission power management process, which can optimize transmission power radiated by femto AP 130 to reduce unnecessary signaling activity. It is noted that adjustment of power radiated from a femto AP (e.g., femto AP 130) intends to reduce the magnitude of signaling activity metrics upon reduction of radiated power. Power management component 205 can implement the automated transmission power adjustment process, and regulate power provided by power supply 215 to communication platform 225. Adjusted transmission power in response to excessive signaling activity (e.g., signaling activity metric above threshold) can lead to efficient confinement of coverage of femto cell (e.g., area 125), wherein mobile devices intended for coverage by a femto access point 130 are served whereas non-intended mobile stations are not. Additionally, optimal or nearly optimal coverage can lead to enhanced battery efficiency of mobile stations (e.g., mobile station $120_A$) that are intended to operate outside a femto cell served by femto AP 130, or substantially any wireless device that can engage in LAU/RAU procedures, or any attachment protocol, with femto AP 130.

As described above, to exploit signaling-triggered power control, power management component 205 can utilize various signal activity metrics or criteria. In an aspect of the subject innovation, signaling activity metrics rely at least in part on measured attachment signaling 228, which includes pilot signal conveyed in specific control channel frame or in-band management frame, and related NW attachment signaling 240. Signaling activity metrics can adopt numeric values or logical values, it should be appreciated that for signaling activity metrics with a logic value (e.g., NON-NULL or NULL, TRUE or FALSE; PASS or FAIL, UP or DOWN . . . ) as an output, thresholds represent an outcome deemed as expected, or desired, e.g., TRUE, PASS, UP, etc. As an illustration, and not by way of limitation, the following are a set of three such signaling activity metrics or criteria. (1) Signaling failure rate. Femto cell coverage is primarily intended for femto traffic that is stationary or slow-moving, confined within the coverage area of the femto cell (e.g., area 145). Typically, it takes time for a femto network (e.g, femto network platform 109) to authorize, e.g., through an Access Control procedure, a UE like mobile $120_A$ for femto cell service (e.g., through femto AP 130) after the UE attempts a LAU/RAU procedure. A fast-moving operating UE beyond the intended femto coverage (e.g., confined area 145, or range area 125) can leave the femto cell and select macro cell coverage (e.g., served by base station 110) before a femto Access Control Procedure is complete. In such a scenario, femto signaling failure rate is likely to be high because femto LAU/RAU messages (e.g., signal radio bearer packets or, alternatively, management frames) can be missed by the UE (e.g., mobile 120) which has already left the femto coverage area (e.g., area 125).

In an aspect, signaling failure rate can be represented as the ratio of a number of incomplete attachment procedures, e.g., $n^{(-)}$, to a net number of attachment procedures, e.g., $n^{(-)}+n^{(+)}$, which includes both complete ($n^{(+)}$) and incomplete ($n^{(-)}$), over a specific time interval $\Delta\tau$. It is noted that other definitions of signaling failure rate can be employed. It should be appreciated that disparate time intervals can have disparate thresholds for this signaling activity metric; for instance, in a location with substantive terminal traffic at specific times of the day, threshold can be lower to ensure a tight power management with ensuing limited coverage confinement, whereas at disparate times of a day, threshold can be higher and thus coverage confinement can be more extensive so as to cover a larger area (e.g., house, driveway, and backyard deck).

(2) Access Control (LAU/RAU) rejection rate. Authorized femto cell users are typically indoors (e.g., inside a building, which can embody confined coverage 145, for example) and stationary or slow-moving, and initiate successful LAU/RAU signaling activity, or most any attachment signaling, to gain access to the service femto network (e.g., femto network platform 109). Unauthorized users (e.g., mobile wireless devices) are typically outdoors, fast moving, and their LAU/RAU procedure signaling attempts are generally rejected by a femto AP serving the femto network. Such outdoors users should not be exposed to, or access, femto AP coverage outside the building (e.g., area 145) that hosts the femto AP (e.g., femto access point 130). Access Control rejection rate, e.g, ratio of attachment rejections over attachment attempts over a specific time interval $\Delta\tau$, can thus be an indication of excessive femto coverage, typically associated with exceedingly high transmission power allocated to the femto AP. It is noted that authorized users can be configured through a femto network (e.g., femto network platform 109) at a time of provisioning the femto AP, or can be configured asynchronously by an administrator subscriber (e.g., a billed incumbent for femto service) of the femto AP.

(3) Average Attach dwell time. Authorized users are allowed to attach to a femto AP (e.g., femto AP 130). When such authorized users leave the femto cell (e.g., cell 125) through which they are covered, authorized femto users are handed off to a macro cell (e.g., cell 105) that offers mobile, outdoor coverage, e.g., the users attach to the macro cell and detach from femto AP. Time interval between an attach instant, e.g., when a femto network grants a request to handover and macro network hands off packet data context(s)

associated with the mobile and other information, and a detach instant, e.g., when macro network grants a handover request and femto network hands off PDP contexts and other data, can be regarded as a dwell time, which is inversely proportional to femto subscriber mobility. Long dwell times can indicate optimal stationary, confined femto traffic, whereas short dwell times can indicate excessive femto AP coverage to areas with high mobility. As an illustration, a home-based femto AP can radiate at a power that covers the interior of the home in addition to a fraction of the house's front yard, in such a situation a subscriber that conducts yard work and enters and exits coverage area, will be covered throughout short dwell time intervals; thus, signaling-based power adjustment can be enacted when the dwell time is below threshold.

A processor (not shown) can be configured to confer, at least in part, functionality to components within femto AP 130, or execute component therein. To that end, the processor can execute code instructions or program modules stored in a memory (e.g., the memory that retains signaling metric(s) store; not shown) functionally coupled to femto AP 130, and exploit related data structures (e.g., objects, classes).

FIG. 2B illustrates an example system 250 of power management component 205 and communication platform 225 that enable features and aspects of signaling-triggered power management in accordance with aspects described herein. Power management component 205 includes a signaling metric constructor 255 that receives attachment signaling 228 (not shown in FIG. 2B) and NW attachment signaling 240 (not shown in FIG. 2B), and computes based at least in part on received and NW attachment signaling various quantities associated with, and which define, predetermined signaling activity metrics like signaling failure rate, access control rejection rate, and dwell time. In addition signaling metric constructor 255 can employ historic attachment signaling data, which can be stored in attachment data 234 (not shown in FIG. 2B), to autonomously define new signaling activity metric; newly defined metrics can be stored within signaling metric(s) store 230. In an aspect, signaling metric constructor 255 includes as timer component (not shown) that facilitates determination of dwell time(s) for authorized subscriber of femto AP 130. In addition, signaling metric constructor 255, via the timer component, can establish time intervals $\{\Delta\tau\}$ that are employed to construct signaling activity rates such as the aforementioned signaling failure rate and access control rejection rate.

In example system 250, monitor component 265 in power management component 205 can monitor a set of one or more signaling activity metrics, or criteria, established through signaling metric constructor 255, and can assess or contrast those signaling activity metrics against their respective predetermined thresholds (e.g., metric thresholds 236). Monitor component 265 also can determine changes trends (e.g., derivatives of signaling activity as a function of time) in order to assess whether power adjustment cycles improve confinement coverage and related signaling activity metrics.

As described above, power management component 205 receives measured attachment signaling (e.g., attachment signaling 228) from communication platform 225. To at least that end, in example system 250, communication platform 225 includes an antenna(s) component 275 that receives OTA the attachment signaling and conveys the received signal to a signaling detection component 285; the antenna(s) component 275 includes associated transmitter(s) and receiver(s) that facilitate communication. Based on the radio technology (e.g., 2nd generation (2G), 3rd generation (3G), and 4th generation (4G)) employed to provide wireless coverage through femto access point 130, signaling detection component 285 can employ various specific standard detection protocol(s) to extract attachment signaling (e.g., channel control symbols in specific resource blocks, decode signal in in-band management frames).

Processor 295 can be configured to confer, at least in part, functionality to components within power management component 205 and communication platform 225, or execute component(s) therein. To at least that end, the processor can execute code instructions or program modules stored in a memory (e.g., the memory that retains signaling metric(s) store; not shown) functionally coupled to femto AP 130, and exploit related data structures (e.g., objects, classes).

Figure 3:
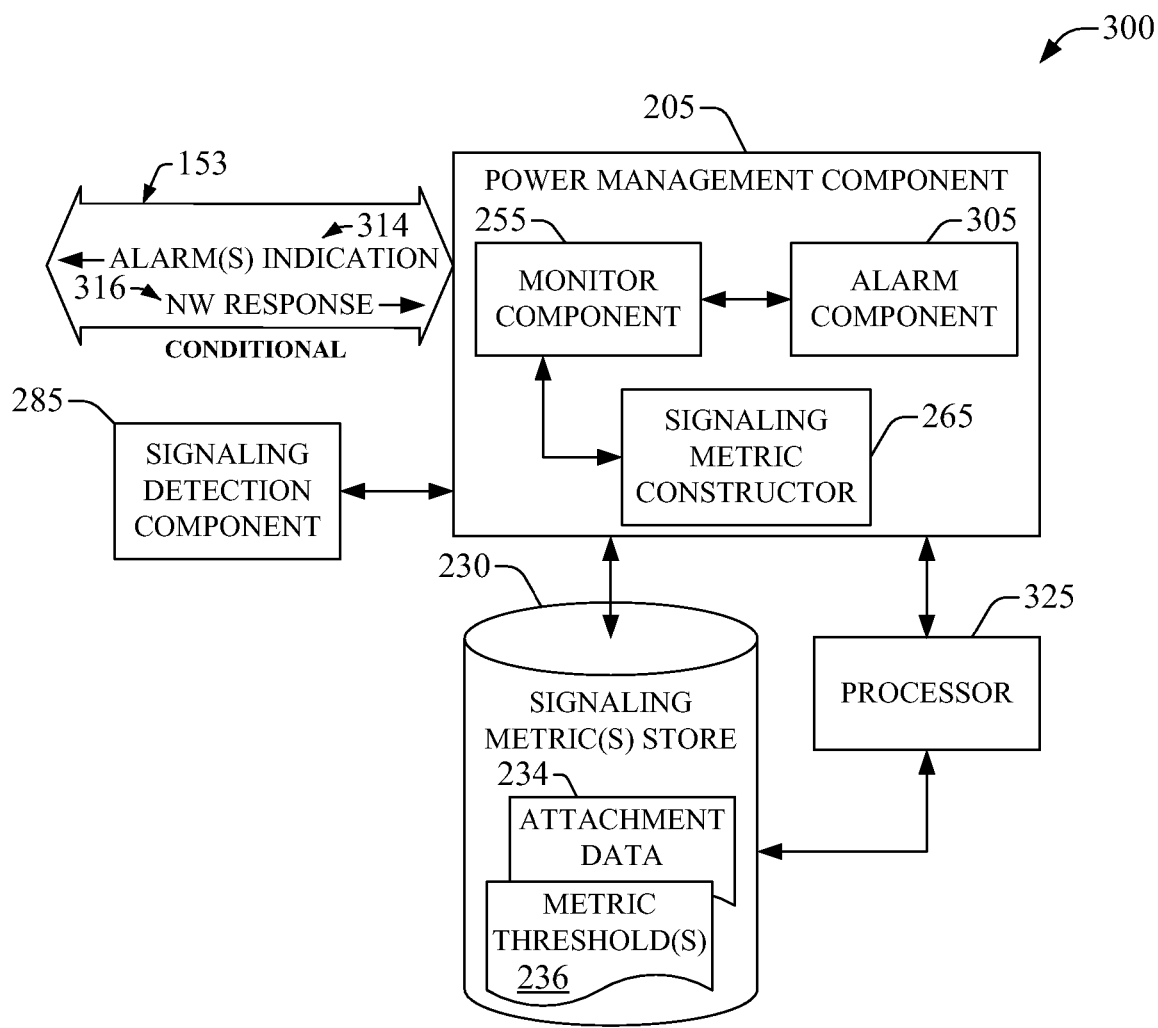
FIG. 3 illustrates an example system that facilitates to alarm a femto access point when signaling-triggered power adjustment fails to mitigate signaling activity metrics in accordance with aspects described herein.

FIG. 3 illustrates an example system 300 that facilitates to alarm a femto access point when signaling-triggered power adjustment fails to mitigate signaling activity metrics in accordance with aspects described herein. It is noted that components with like numerals as in example system(s) or embodiment(s) described above have the same functionality as previously described. In an aspect of the subject innovation, if transmission power, or power radiated by femto AP 130, is reduced as a result of implementation of a signaling-triggered power adjustment as described above, a set of signaling activity metrics are expected to improve (e.g., recede below thresholds), and such improvement can be measured, e.g., via monitor component 265, to monitor a response to power adjustment. In example system 300, power management component 205 includes an alarm component 305, which triggers alarm(s) and conveys alarm(s) indication 314, through backhaul link(s) 153, when transmission power of a femto AP (e.g., femto AP 130) increases as a result of signaling-triggered power adjustment process, or signaling activity metrics (e.g., signaling failure rate, access control rejection rate, and dwell time) or call activity fail to improve.

Femto network (e.g., femto network platform 109) in response to the alarm(s) indication 314 delivers a network (NW) response 316 that can be received by power management component 205. Network response 316 can be embodied in various commands or directives to a femto AP that receives it. For example, illustrative examples of NW response 316 include the following four: (i) Indication to trigger a self-diagnostic procedure in femto AP, the procedure can be conducted by monitor component 255. Outcome of the procedure can be stored in a memory or conveyed to the femto network platform for analysis. (ii) Indication to restart femto AP. In such scenario, any voice or data sessions served through the femto AP can be cached either in a memory native to the femto AP or in the femto network (e.g., femto network platform 109), and reinitiated after femto AP is restarted. It is noted that data sessions originating from applications sensitive to interruptions such as ecommerce, banking, or voice, can preempt the indicated restart cycle until such data sessions are completed. (iii) Indication to display a malfunction indicator in a display interface of the femto AP (e.g., light emitting diode (LED) lights or a message in a an liquid crystal display (LCD) screen, both displayed in a femto AP as part of a display interface thereof). The malfunction indicator can be conveyed as a visual, aural, or physical (e.g., vibration) indication. (iv) A customer service notification, wherein visual, aural, and physical (e.g., vibration of a portion of a femto AP) indicia in the femto AP associated with NW response 316 can prompt a subscriber to reset or reconfigure the femto AP, or to contact customer service for technical assistance and equipment diagnosis. Based on privacy settings at a time of provisioning femto AP, a subscriber linked to the femto AP and billed for femto service, can receive a short message service (SMS), a multimedia message service (MMS) communication, or a voice communication as embodiments of a notification.

Processor 325 can be configured to confer, at least in part, functionality to components within power management component 205 and communication platform 275, or execute component(s) therein. To at least that end, the processor can execute code instructions or program modules stored in a memory (e.g., the memory that retains signaling metric(s) store; not shown) functionally coupled to femto AP 130, and exploit related data structures (e.g., objects, classes).

Figure 4:
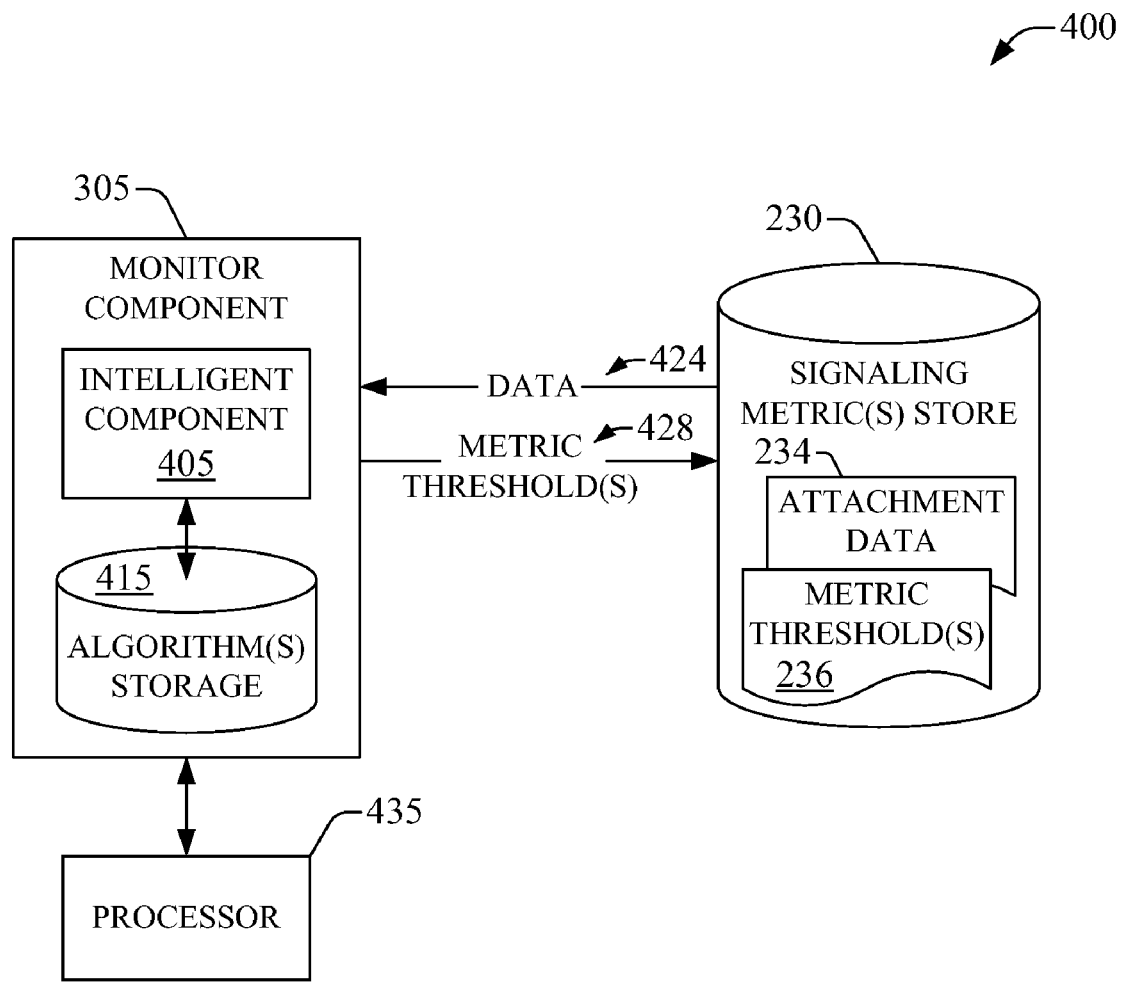
FIG. 4 is a block diagram of an example system that generates and retains signaling activity metric threshold(s) in accordance with aspects described herein.

FIG. 4 is a block diagram of an example system 400 that automatically generates and retains signaling activity metric threshold(s) in accordance with aspects described herein. Automated generation of signaling activity metric thresholds can take place in accordance to a schedule, or as a function of a predetermined number of signaling-triggered power adjustment events or cycles. Intelligent component 405, which can reside within monitor component 305, collects at least a portion of historic attachment data, e.g., data 424, from attachment data 234. Collected data 424 is relevant to a specific threshold that is to be determined; e.g., data 424 includes a first set of data when computing a signaling metric threshold for dwell time, and it includes a second set of data when determining a threshold for access control rejection rate. It is noted that the first a second sets of data can overlap, based upon a degree of correlation among the signaling activity metrics associated with the data sets; intelligent component 405 can determine such degree of correlation. In addition, collected historic data can span an adjustable time interval, wherein adjustment aim at including additional data so as to converge a determination of metric threshold(s) 428. It should be appreciated that intelligent component 405 can reside within other components in power management component 205, or femto access point 130. Through one or more algorithms extant in algorithm(s) store 415, intelligent component 405 can establish metric threshold(s) based at least in part on the collected historic attachment data, the thresholds are conveyed to signaling metric(s) store 230, and retained in metric threshold(s) 236.

To generate or infer (e.g., reason and draw a conclusion based upon a set of metrics, arguments, or known outcomes in controlled scenarios) metric threshold(s) 428, intelligence component 405 can exploit artificial intelligence (AI) methods. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In an aspect, processor 435 performs at least a portion of the computations necessary to implement the AI methods, which can reside at least in part within algorithm(s) store 415. To increase computational efficiency, processor 435 can schedule generation of metric threshold(s) 428 during time interval of low processor load, or low activity in femto AP 130.

In particular, to infer and establish signaling metric threshold(s), intelligent component 405 can employ one of numerous methodologies for learning from data and then drawing inferences from the models so constructed. In an aspect, the methodologies are retained at least in part on algorithm(s) storage 415. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

Figure 5:
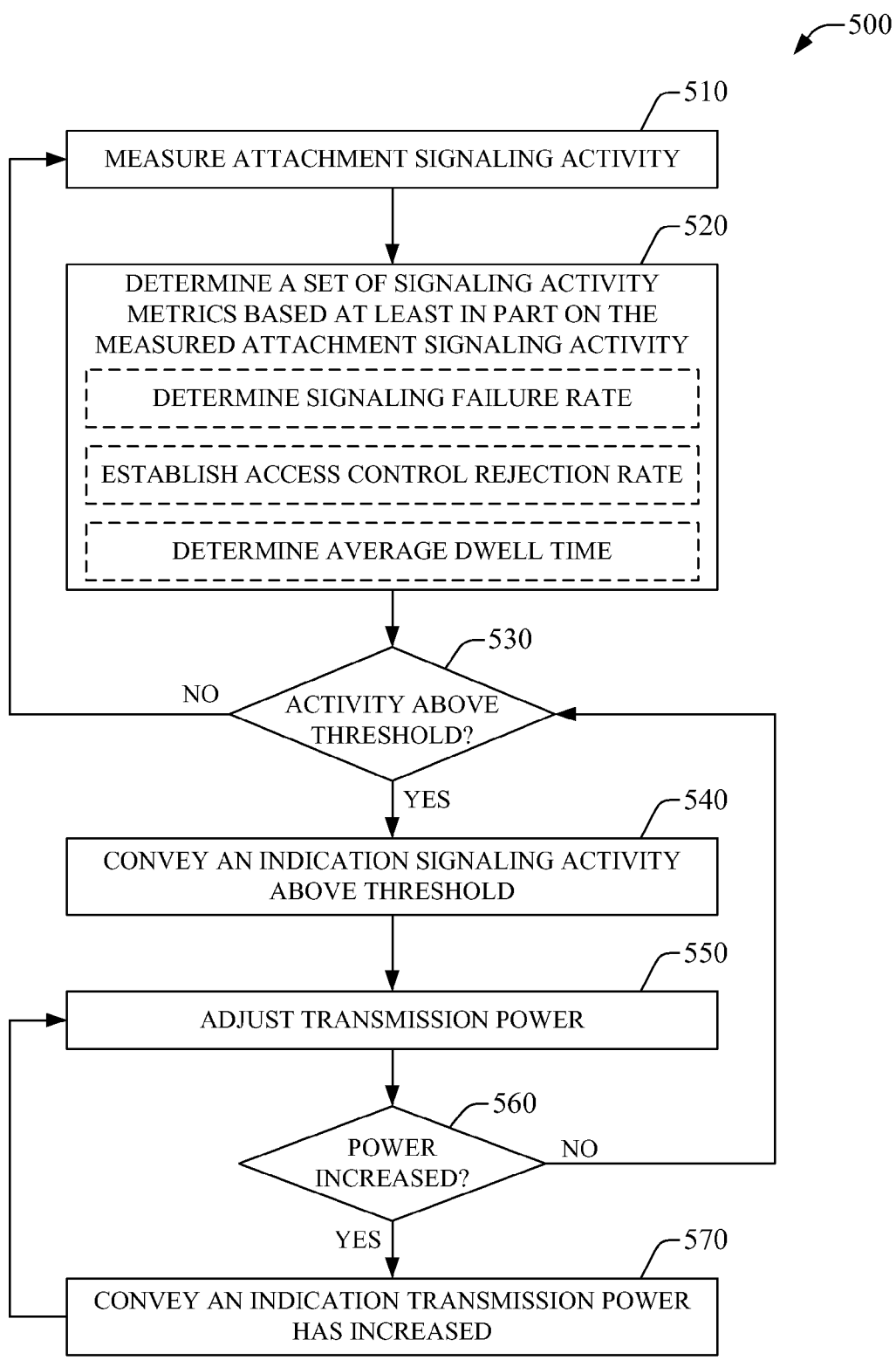
FIG. 5 presents a flowchart of an example method for signaling-triggered power adjustment according to aspects described in the subject specification.
Figure 6:
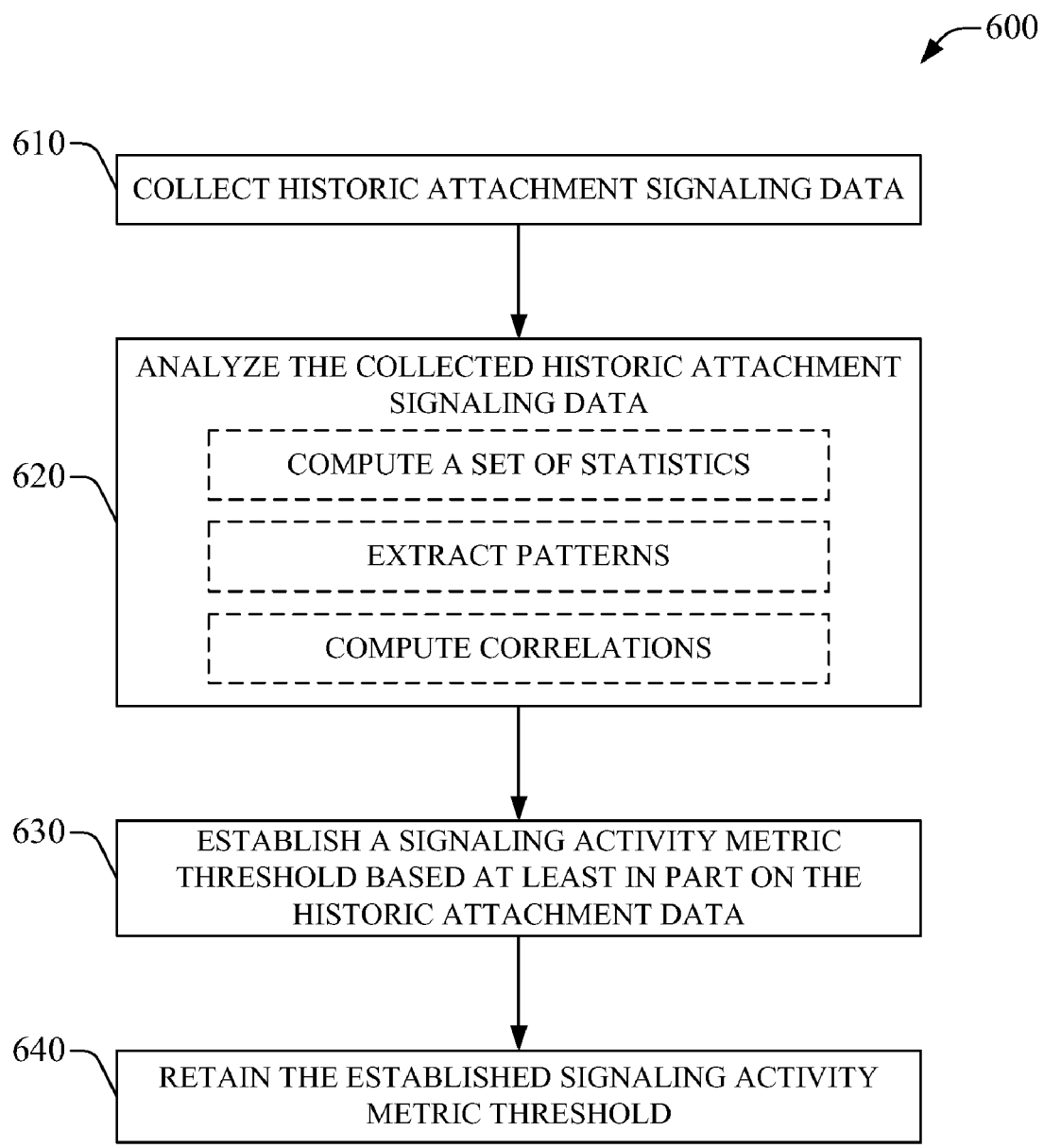
FIG. 6 is a flowchart of an example method for setting signaling activity threshold(s) according to aspects described herein.
Figure 7:
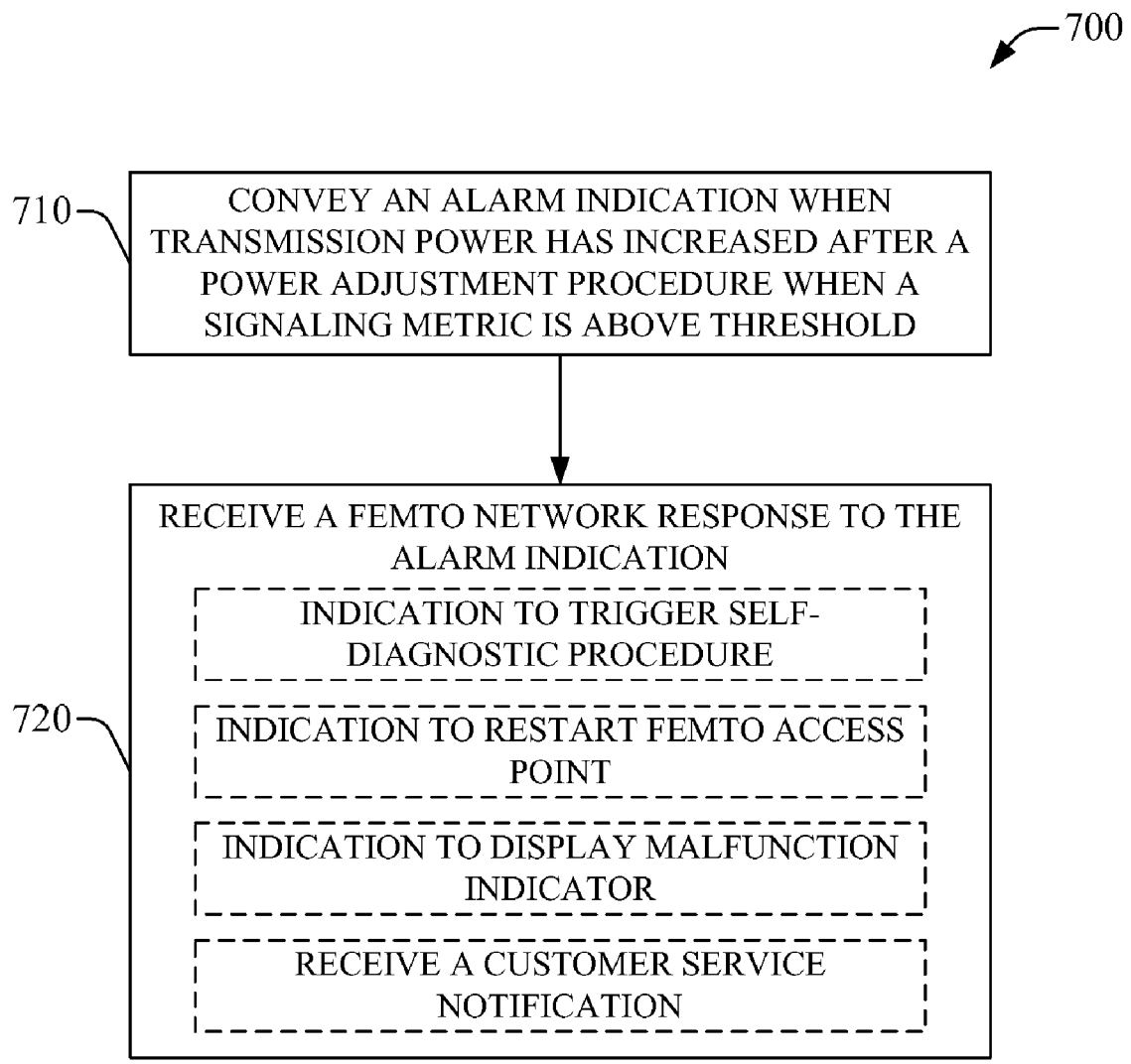
FIG. 7 is a flowchart of an example method for alarming a femto access point when power increases as a result of power adjustment procedure according to aspects described herein.

In view of the example systems described above, example methodologies that can be implemented in accordance with the disclosed subject matter can be better appreciated with reference to flowcharts in FIGS. 5-7. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram or call flow. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be still further appreciated that the methodologies disclosed hereinafter and throughout this specification are capable of being stored on an article of manufacture to facilitate transporting and transferring such methodologies to computers for execution by a processor or for storage in a memory.

FIG. 5 is a flowchart of an example method 200 for adjusting transmission power of a femto cell based at least in part on signaling activity. In an aspect, example method 500 can be carried out in a femto cell access point (e.g., femto AP 130). At act 510, attachment signaling activity is measured. The signaling activity includes LAU/RAU activity associated with attachment procedure(s) of a mobile station (e.g., UE 120$_A$) and a femto AP (femto AP 130). At act 520, a set of signaling activity metrics are determined based at least in part on the measured attachment signaling activity. The set of signaling activity metrics can include, but is not limited to, one or more elements like signaling failure rate, access control failure rate, and attachment dwell time. At act 530 it is checked, or evaluated, whether a signaling activity metric is above a threshold (e.g., metric threshold(s) 236). Such a threshold can be set at a time of installation, or provisioning, of a femto AP and can be adjusted subsequently to optimize performance of devices served by the femto cell. When a signaling activity metric is above a defined threshold, an indication is conveyed (e.g., an alarm is triggered) that signaling activity is above threshold at act 540. It should be appreciated that indication can be a logic variable, retained in a memory, in an application or program module executed by a processor that operates the femto access point that enacts the subject example method. Conversely, when signaling activity metric is below threshold, flow is directed to act 510 to continue monitoring attachment signaling activity. At act 550, transmission power is adjusted, for example as a response to an indication of excessive, or above threshold, signaling activity. At act 560, it is probed whether the transmission power increased as a result of the power adjustment. When power increases, an indication of such increase is conveyed at act 270, and flow is directed to act 550 for further power adjustment. In an aspect, a retry cycle can impose a specific number of power readjustments, when the retry cycle expires an alarm indication can be conveyed. Conversely, when transmitted power decreases, flow is directed to act 530 to determine is signaling activity has improved, e.g., the activity metric is below threshold.

FIG. 6 is a flowchart of an example method 600 for setting signaling activity threshold(s) according to aspects described herein. In an aspect, the subject example method 600 can be enacted by a component that monitors attachment signaling (e.g., monitor component 305) within a femto access point (e.g., femto AP 130). Alternatively, or in addition, this example method 600 can be implemented at the network level (e.g., within femto network platform 109). At act 610, historic attachment signaling data is collected. The attachment signaling data also include signaling activity metric values associated with the historic data. In an aspect, the historic attachment data can be retained in a memory within the femto access point that houses the component that collects the historic data. At act 620, the collected historic attachment signaling data is analyzed. Almost any technique for analysis of time series can be employed; the time series is generated through attempts to attach, or attachment events as a function of time. In an aspect, a set of statistics such as data distribution momenta (average, variance and standard deviation, . . . ) can be computed. In another aspect, at least a portion of the analysis can include computation (e.g., at least in part via processor 435) of time correlations, such correlations can reveal effects of subscriber mobility, mobile devices served by neighboring femto APs, etc. In yet another aspect, patterns of attachment attempts, attachment rejection, dwell time(s) of authorized mobiles devices, or the like, can be extracted. At act 630, a signaling activity metric threshold is determined based at least in part on the historic attachment signaling data, and analysis thereof. In an aspect, determination is made inferring a suitable threshold from the historic data. Various machine learning methods, as discussed above, can be employed to infer a threshold. At act 640, the established signaling activity metric threshold is retained, typically in a memory (e.g., signaling metric(s) store 230).

FIG. 7 is a flowchart of an example method 700 for alarming a femto access point when power increases as a result of power adjustment procedure according to aspects described herein. In an aspect, this example method 700 can be enacted by a component within a femto access point that exploits signaling-triggering power adjustment as described herein. At act 710 an alarm indication is conveyed when transmission power has increased after a power adjustment procedure when signaling metric is above threshold. The alarm indication is conveyed to a femto network platform (e.g., femto network platform 109). In an aspect, the alarm can be conveyed after a retry cycle of power adjustment, wherein for a predetermined number of instances a femto access point (e.g., femto AP 130) attempts to readjust power after an indication (e.g., logic flags or intra-AP alarm(s)) that power has increased (see, e.g., act 570). In another aspect, the retry cycle can be bypassed and the alarm indication conveyed after transmission power increases. At act 720, a femto network response to the alarm indication is received. Various responses from the network can be received by a femto AP that includes the component that delivers an alarm indication; for instance, at least the following four responses can be received: (i) an indication to trigger a self-diagnostic procedure; (ii) an indication to restart femto access point (e.g., femto AP 130); (iii) indication to display a malfunction indicator; or (iv) a customer service notification (e.g., a SMS communication, a MMS communication, an email, an instant message . . . ) delivered to a designated device, mobile or otherwise, of a femto cell administrator.

Figure 8:
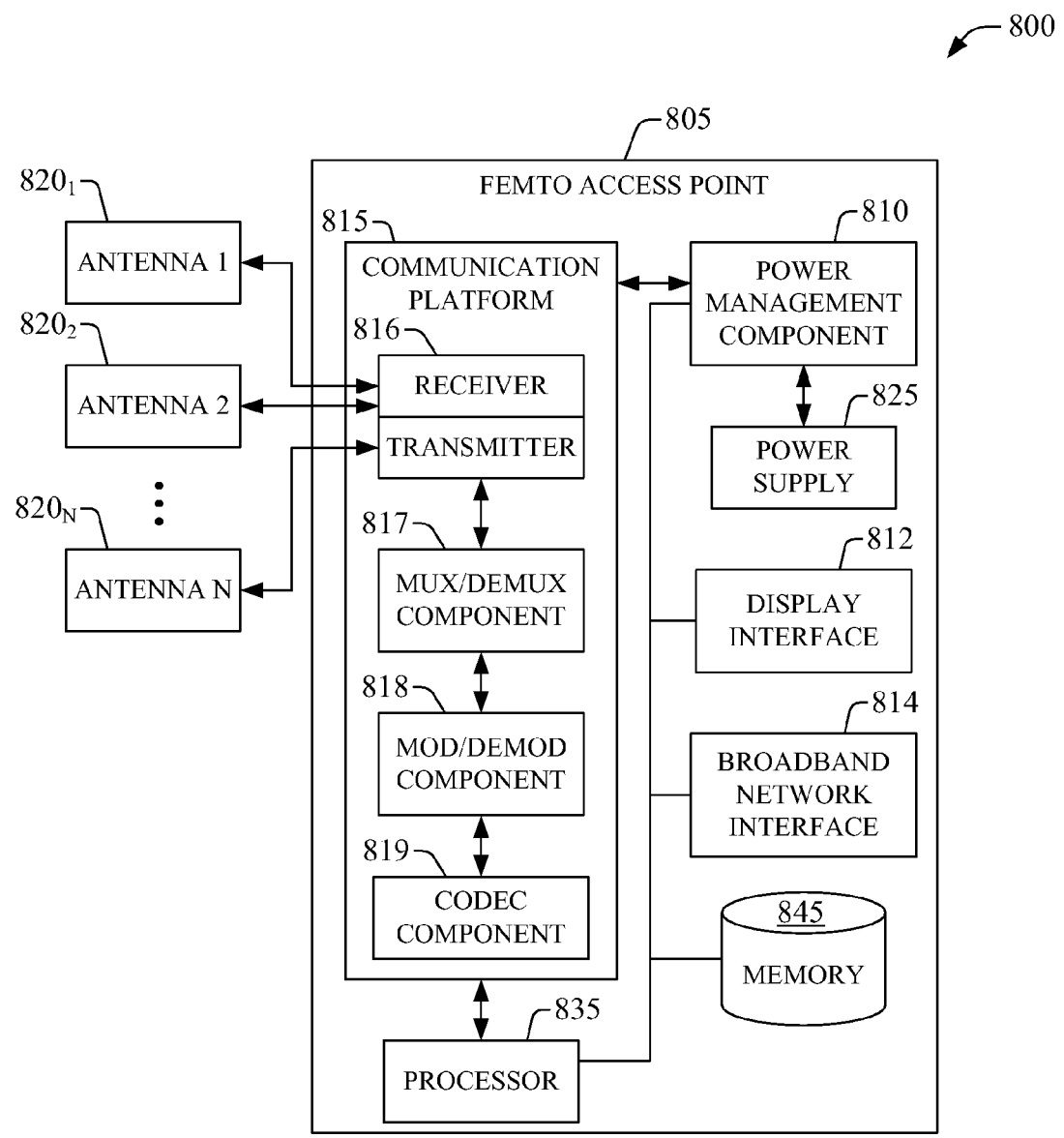
FIG. 8 illustrates a block diagram of an example embodiment of a femto cell access point that can enable and exploit features or aspects of the subject innovation.
Figure 9:
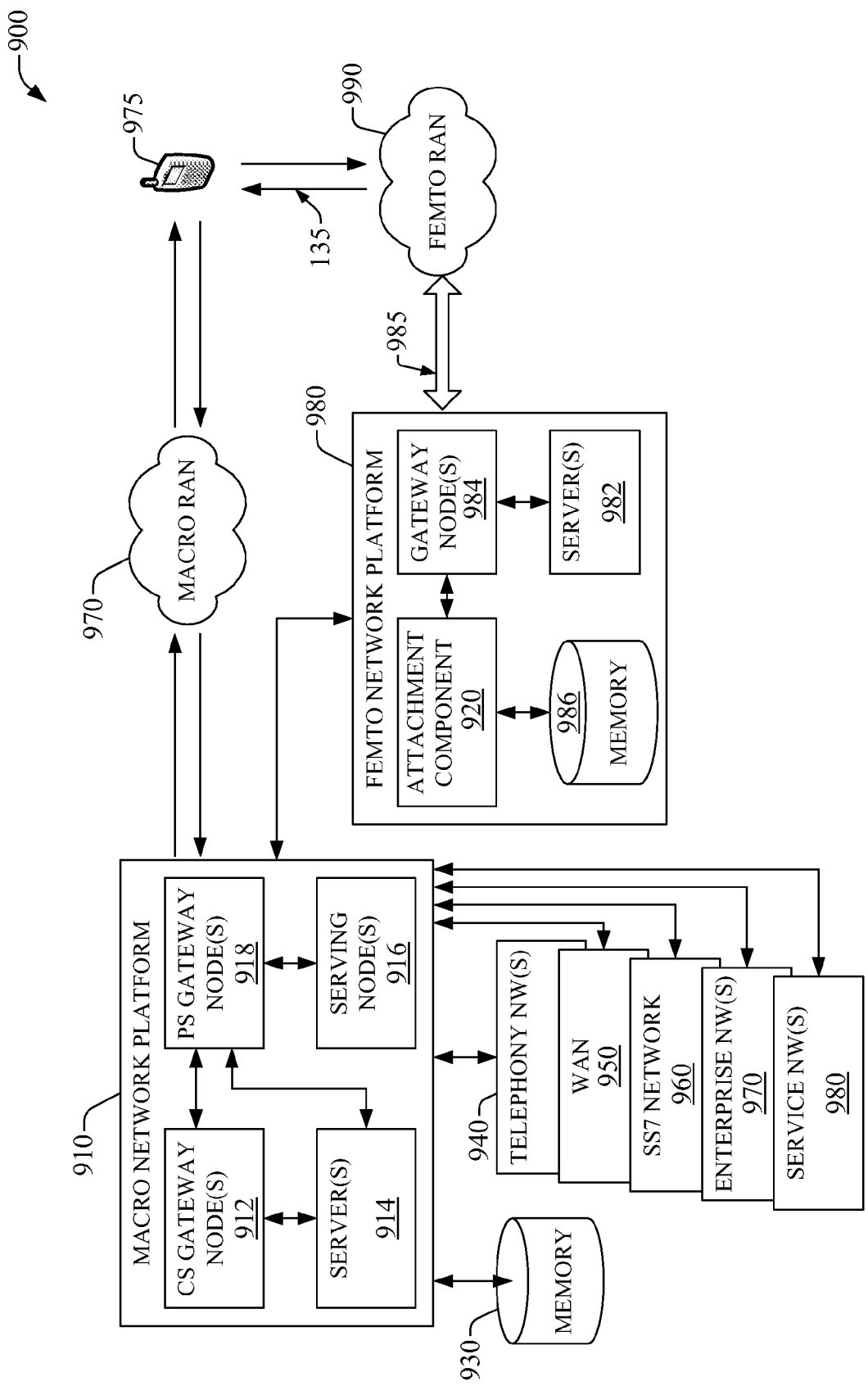
FIG. 9 illustrates example macro and femto wireless network environments that can exploit femto APs that utilize aspects of the subject innovation.

To provide further context for various aspects of the subject specification, FIG. 8 and FIG. 9 illustrate, respectively, a block diagram of an example embodiment of a femto cell access point that can enable and exploit features or aspects of the subject innovation and example macro and femto wireless network environments that can exploit femto APs that utilize aspects of the subject innovation in accordance with various aspects of the subject specification. In embodiment 800, femto AP 805 can receive and transmit signal(s) (e.g., attachment signaling) from and to wireless devices like femto access points, access terminals, wireless ports and routers, or the like, through a set of antennas $820_1$-$820_N$ (N is a positive integer). It should be appreciated that antennas $820_1$-$820_N$ embody antenna(s) component 275, and are a part of communication platform 815, which comprises electronic components and associated circuitry that provides for processing and manipulation of received signal(s) and signal(s) to be transmitted. Such electronic components and circuitry embody at least in part signaling detection component 285; communication platform 815 operates in substantially the same manner as communication platform 225 described hereinbefore. In an aspect, communication platform 815 includes a receiver/transmitter 816 that can convert signal (e.g., attachment signaling 228) from analog to digital upon reception, and from digital to analog upon transmission. In addition, receiver/transmitter 816 can divide a single data stream into multiple, parallel data streams, or perform the reciprocal operation. Coupled to receiver/transmitter 816 is a multiplexer/demultiplexer 817 that facilitates manipulation of signal in time and frequency space. Electronic component 817 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 817 can scramble and spread information (e.g., codes) according to substantially any code known in the art; e.g., Hadamard-Walsh codes, Baker codes, Kasami codes, polyphase codes, and so on. A modulator/demodulator 818 is also a part of communication platform 815, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 815 also includes a coder/decoder (codec) component 819 that facilitates decoding received signal(s), and coding signal(s) to convey.

Femto access point 805 also includes a processor 835 configured to confer functionality, at least in part, to substantially any electronic component in femto AP 805. In particular, processor 335 can facilitate signaling-triggered power adjustment associated with power management component 810, which operates in the same manner as power management component 205 in accordance to various aspects and embodiments disclosed herein. In an aspect, power management component 810 is functionally connected to power supply 825, and can regulate output power output there from as a part of signaling-triggered power adjustment cycle(s) as described herein. Power supply 825 can attach to a conventional power grid and include one or more transformers to achieve power level that can operate femto AP 805 components and circuitry. Additionally, power supply 825 can include a rechargeable power component to ensure operation when femto AP 805 is disconnected from the power grid.

Additionally, femto AP 805 includes display interface 812, which can display functions that control functionality of femto AP 805, or reveal operation conditions thereof (e.g., light-emitting-diode (LED) indicator(s) that convey a malfunction condition as a part of a NW response to an alarm indication delivered by power management component 810. In addition, display interface 812 can include a screen to convey information to an end user; for instance, display interface 812 can display a message to restart femto AP 805 as a part of a NW response to an alarm indication delivered by power management component 810. In an aspect, display interface 812 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user. Display interface 812 also facilitates data entry (e.g., through a linked keypad or via touch gestures), which can facilitated femto AP 805 to receive external commands (e.g., restart operation, or user-based metric threshold(s) 236).

Broadband network interface facilitates connection of femto AP 805 to femto network via backhaul link(s) 153 (not shown), which enables incoming and outgoing data flow. Broadband network interface 814 can be internal or external to femto AP 805, and it can utilize display interface 812 for end-user interaction and status information delivery.

Processor 835 also is functionally connected to communication platform 815 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 835 is functionally connected to display interface 812 and broadband network interface 814 to confer, at least in part functionality to each of such components.

In femto AP 805, memory 845 can store data structures, code instructions and program modules, system or device information, code sequences for scrambling, spreading and pilot transmission, femto AP floor plan configuration, and so on. Processor 835 is coupled to the memory 355 in order to store and retrieve information necessary to operate and/or confer functionality to communication platform 815, power management component 810, and other components of femto access point 805.

With respect to FIG. 9, wireless communication environment 1000 includes two wireless network platforms: (i) A macro network platform 910 which serves, or facilitates communication with user equipment 975 (e.g., mobile 120$_A$) via a macro radio access network (RAN) 970. It should be appreciated that in cellular wireless technologies (e.g., 3GPP UMTS, HSPA, 3GPP LTE, 3GPP2 UMB), macro network platform 910 is embodied in a Core Network. (ii) A femto network platform 980, which can provide communication with UE 975 through a femto RAN 990, which is linked to the femto network platform 980 via backhaul pipe(s) 985 (e.g., backhaul link(s) 153). It should be appreciated that macro network platform 910 typically hands off UE 975 to femto network platform 910 once UE 975 attaches (e.g., through macro-to-femto handover) to femto RAN 990, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 105, while femto RAN 990 can comprise multiple femto cell access points such as femto AP 130. Deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 1040 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, PS gateway node(s) 918 can be embodied in gateway GPRS support node(s) (GGSN).

In addition to receiving and processing CS-switched traffic and signaling, PS gateway node(s) 918 can authorize and authenticate PS-based data sessions with served (e.g., through macro RAN) wireless devices. Data sessions can include traffic exchange with networks external to the macro network platform 910, like wide area network(s) (WANs) 950, enterprise networks (NW(s)) 970 (e.g., enhanced 911), or service NW(s) 980 like IP multimedia subsystem (IMS); it should be appreciated that local area network(s) (LANs), which may be a part of enterprise NW(s), can also be interfaced with macro network platform 910 through PS gateway node(s) 918. Packet-switched gateway node(s) 918 generates packet data contexts when a data session is established. To that end, in an aspect, PS gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 1018 (e.g., GGSN) and tunnel interface (e.g., TTG) comprise a packet data gateway (PDG).

Macro network platform 910 also includes serving node(s) 916 that convey the various packetized flows of information, or data streams, received through PS gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to PS gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and PS gateway node(s) 918 can enact. Moreover, server(s) 914 can provision services from external network(s), e.g., WAN 950, or Global Positioning System (GPS) network(s), which can be a part of enterprise NW(s) 980. It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN 950, SS7 network 960, enterprise NW(s) 970, or service NW(s) 980.

Regarding femto network platform 980, it includes a femto gateway node(s) 984, which have substantially the same functionality as PS gateway node(s) 918. Additionally, femto gateway node(s) 984 can also include substantially all functionality of serving node(s) 916. Disparate gateway node(s) 984 can control or operate disparate sets of deployed femto APs, which can be a part of femto RAN 990. In an aspect of the subject innovation, femto gateway node(s) 984 can aggregate operational data received from deployed femto APs. Moreover, femto gateway node(s) 984, can convey received attachment signaling to attachment component 920. It should be appreciated that while attachment component is illustrated as external to gateway node(s) 984, attachment component 920 can be an integral part of gateway node(s) 984.

Attachment component 920 can facilitate macro-to-femto and femto-to-macro handover. In an aspect, NW attachment signaling 240 can be received, processed, and conveyed to a femto AP as a part of attachment procedure among a mobile station and the femto AP. Attachment component 920 also can receive alarm(s) indication 314, and process, at least in part, such indication to generate a NW response 316 like an indication to restart femto AP; a customer service notification, which can be accomplished through communication with enterprise network(s) 970 that provides customer service support; indication to display a malfunction indicator . . . ).

Memory 986 can retain additional information relevant to operation of the various components of femto network platform 980. For example operational information that can be stored in memory 986 can comprise, but is not limited to, subscriber intelligence; contracted services; maintenance and service records; femto cell configuration (e.g., devices served through femto RAN 990; authorized subscribers associated with one or more deployed femto APs); service policies and specifications; privacy policies; add-on features; so forth.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. Furthermore, server(s) 982 can effect provisioning of femto cell service, and effect operations and maintenance. It is to be noted that server(s) 982 can include one or more processors configured to provide at least in part the functionality of femto network platform 980. To that end, the one or more processors can execute code instructions stored in memory 986, for example.

Various aspects or features described herein may be implemented as a method; apparatus, either as hardware or hardware and software or firmware; or article of manufacture using standard programming and/or engineering techniques. Implementation(s) that include software or firmware can be implemented at least in part through program modules stored in a memory and executed by a processor. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs [e.g., compact disk (CD), digital versatile disc (DVD), Blu-ray disc (BD) . . . ], smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, the term "memory" refers to data stores, algorithm stores, and substantially any other information store relevant to operation and functionality of a component comprising the memory; for instance, such information can comprise, but is not limited to, signaling metric thresholds, historic attachment data, subscriber information, femto cell configuration (e.g., devices served by a femto AP), location identifiers, and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes," "has," "possesses," and the like are used in either the detailed description or the claims, such terms are intended to be inclusive in a manner similar to the term "comprising" as "comprising" is interpreted when employed as a transitional word in a claim.

What is claimed is:

1. A system that provides signaling-triggered transmission power management in a femto cell access point, the system comprising:
   a communication platform configured to receive and measure an attachment signaling activity;
   a signaling metric constructor configured to evaluate a signaling activity metric based at least in part on the measured attachment signaling activity and a received network attachment signaling, wherein the signaling activity metric comprises a signaling failure rate that is a function of a ratio of a number of incomplete attachment procedures to a net number of attachment procedures over a specific time interval; and
   a power management component configured to adjust transmission power of the femto cell access point in response to the signaling activity metric exceeding a threshold.

2. The system of claim 1, further comprising a monitor component configured to determine confinement coverage performance based on trends derived from observation of power adjustments and signaling activity metrics.

3. The system of claim 2, the signaling metric constructor comprises a timer component configured to facilitate determination of the signaling failure rate.

4. The system of claim 2, wherein the signaling metric constructor is further configured to establish the specific time interval.

5. The system of claim 1, wherein the signaling activity metric further comprises a dwell time that is a time interval between an attach instant of a mobile device to the femto cell access point and a detach instant of the mobile device from the femto cell access point, wherein the attach time comprises a time a femto network grants a request to handover and a macro network hands off first data associated with the mobile device to the femto network, and the detach time comprises a time a macro network grants a handover request and the femto network hands off second data associated with the mobile device to the macro network.

6. The system of claim 1, wherein the power management component comprises an alarm component configured to convey an alarm indication to a femto network platform in response to transmission power of the femto cell access point increasing after a power adjustment in response to the signaling activity metric exceeding the threshold.

7. The system of claim 6, wherein the power management component is further configured to receive a response from the femto network platform to the alarm indication, wherein the response comprises at least one of a directive for the femto cell access point to trigger a self-diagnostic procedure, a directive to restart the femto cell access point, a directive for the femto cell access point to provide a malfunction indicator that is at least one of visual, aural, or physical, or a directive for the femto cell access point to provide a customer service notification to a designated device.

8. The system of claim 1, further comprising a component configured to configure the threshold at a time the femto cell access point is provisioned.

9. The system of claim 1, further comprising a component configured to automatically generate the threshold in accordance to at least one of a schedule or a function of a predetermined number of transmission power adjustments.

10. The system of claim 1, further comprising a component configured to automatically generate the threshold based at least in part on an analysis of historic attachment data.

11. A method for facilitating signaling-triggered transmission power management in a femto cell, the method comprising:
    measuring an attachment signaling activity in a femto cell access point;
    determining a signaling activity metric based at least in part on the measured attachment signaling activity, wherein the signaling activity metric comprises an access control rejection rate that is a function of a ratio of attachment rejections over attachment attempts over a corresponding time interval; and
    adjusting a transmission power of the femto cell access point in response to the signaling activity metric exceeding a threshold.

12. The method of claim 11, further comprising triggering an indication that the signaling activity metric exceeds the threshold.

13. The method of claim 12, further comprising triggering an alarm indication to a femto network in response to the transmission power increasing upon the adjusting the transmission power of the femto cell access point.

14. The method of claim 13, further comprising readjusting the transmission power.

15. The method of claim 14, further comprising receiving a response to the alarm indication from the femto network.

16. The method of claim 15, wherein the femto network response comprises at least one of an indication for the femto cell access point to trigger a self-diagnostic procedure, an indication for the femto cell access point to restart the femto cell access point, an indication for the femto cell access point to provide a malfunction indicator that is at least one of visual, aural, or physical, or an indication for the femto cell access point to provide a customer service notification to a designated device.

17. The method of claim 11, further comprising collecting historic attachment signaling data for the femto cell access point, and analyzing the collected historic attachment signaling data.

18. The method of claim 17, further comprising establishing the threshold based at least in part on the collected historic attachment signaling data.

19. The method of claim 18, further comprising automatically generating the threshold in accordance with at least one of a schedule or a function of a predetermined number of transmission power adjustments.

20. A non-transitory computer-readable medium having instructions stored thereon that, in response to execution, cause at least one computing device to perform operations comprising:
    measuring an attachment signaling activity in a femto cell access point;
    determining a signaling activity metric based at least in part on the measured attachment signaling activity, wherein the signaling activity metric comprises a dwell time that is a time interval between an attach time of a mobile device to the femto cell access point and a detach time of the mobile device from the femto cell access point, wherein the attach time comprises a time a femto network grants a request to handover and a macro network hands off first data associated with the mobile device to the femto network, and the detach time comprises a time a macro network grants a handover request and the femto network hands off second data associated with the mobile device to the macro network; and adjusting a transmission power for the femto cell access point in response to the signaling activity metric exceeding a threshold.

* * * * *